July 4, 1944.  H. LORANT  2,352,960
BAR CONVEYER DEVICE FOR EXTRUSION PRESSES
Filed March 21, 1942  6 Sheets-Sheet 1

INVENTOR.
HUGO LORANT
BY
ATTORNEYS

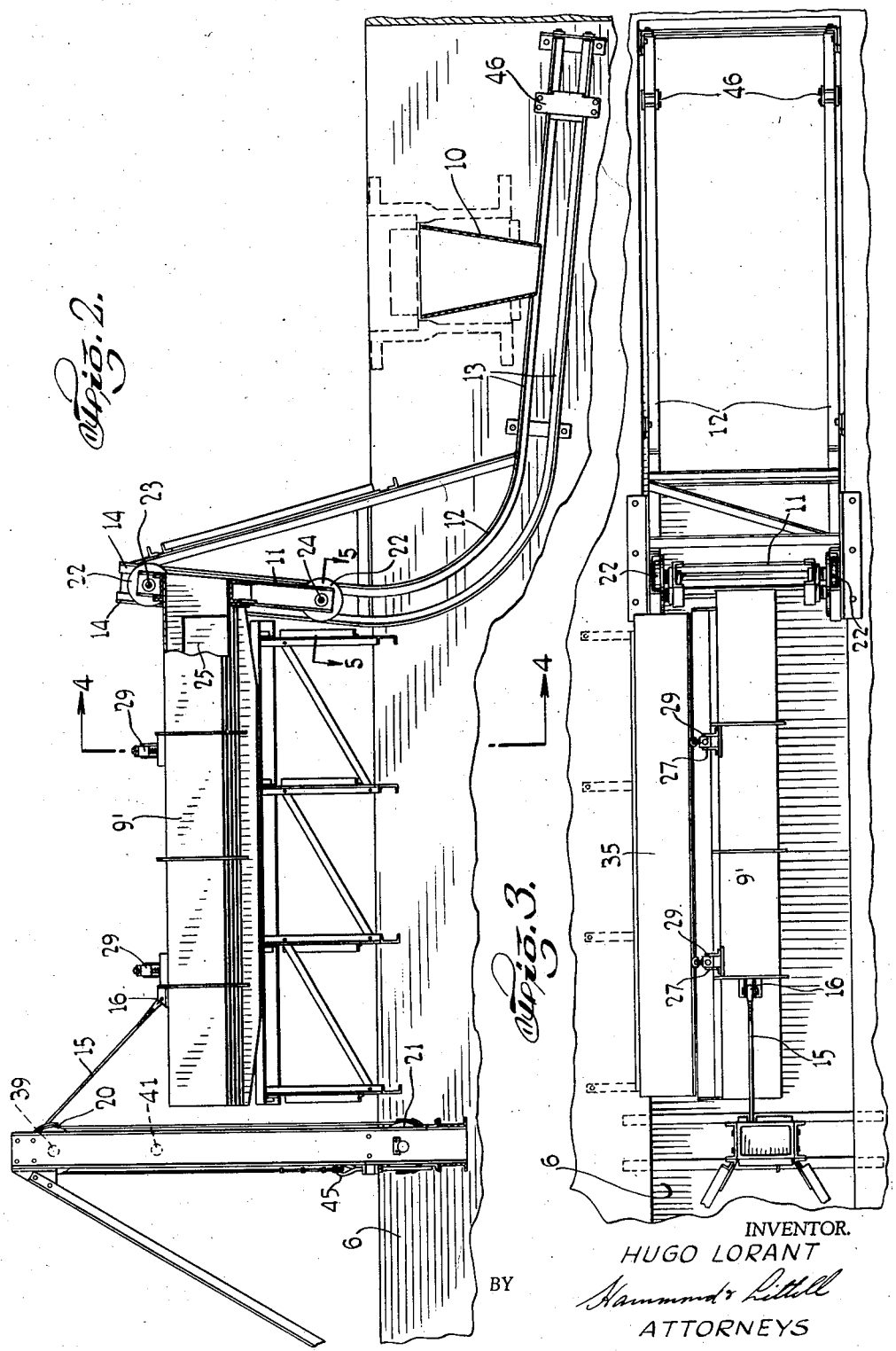

July 4, 1944. H. LORANT 2,352,960
BAR CONVEYER DEVICE FOR EXTRUSION PRESSES
Filed March 21, 1942 6 Sheets-Sheet 3
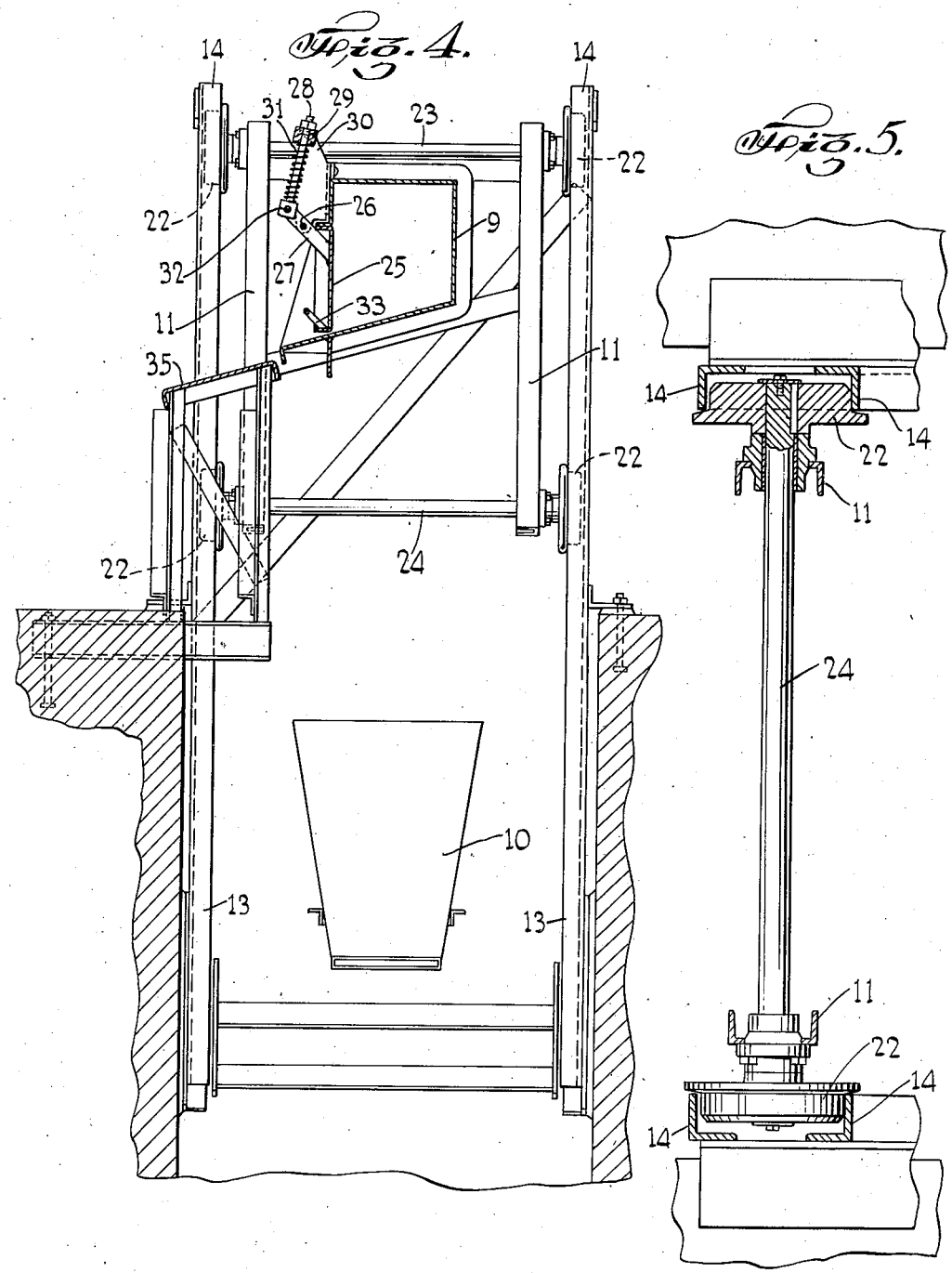
INVENTOR.
HUGO LORANT
BY
ATTORNEYS

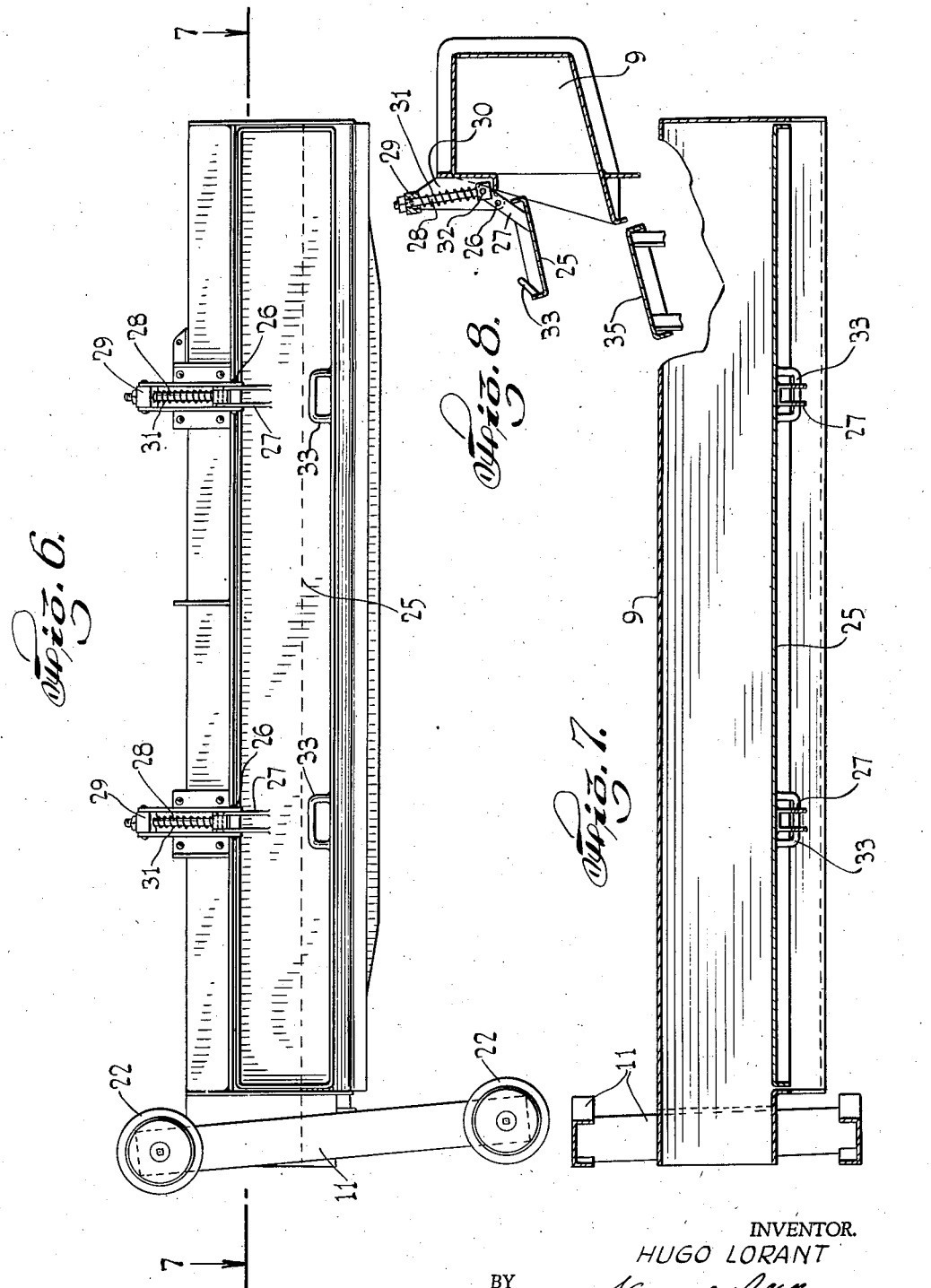

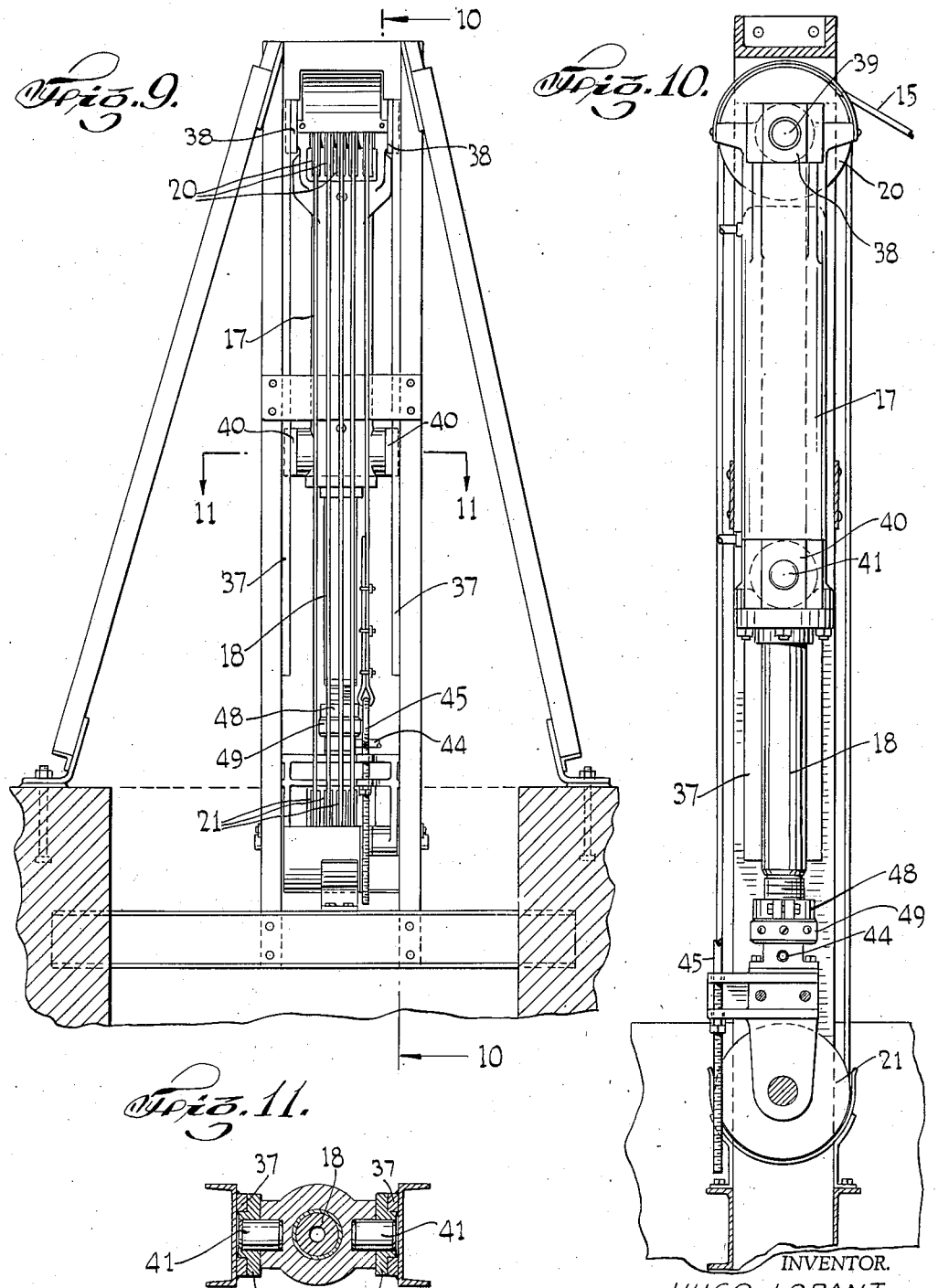

July 4, 1944. H. LORANT 2,352,960
BAR CONVEYER DEVICE FOR EXTRUSION PRESSES
Filed March 21, 1942 6 Sheets-Sheet 6
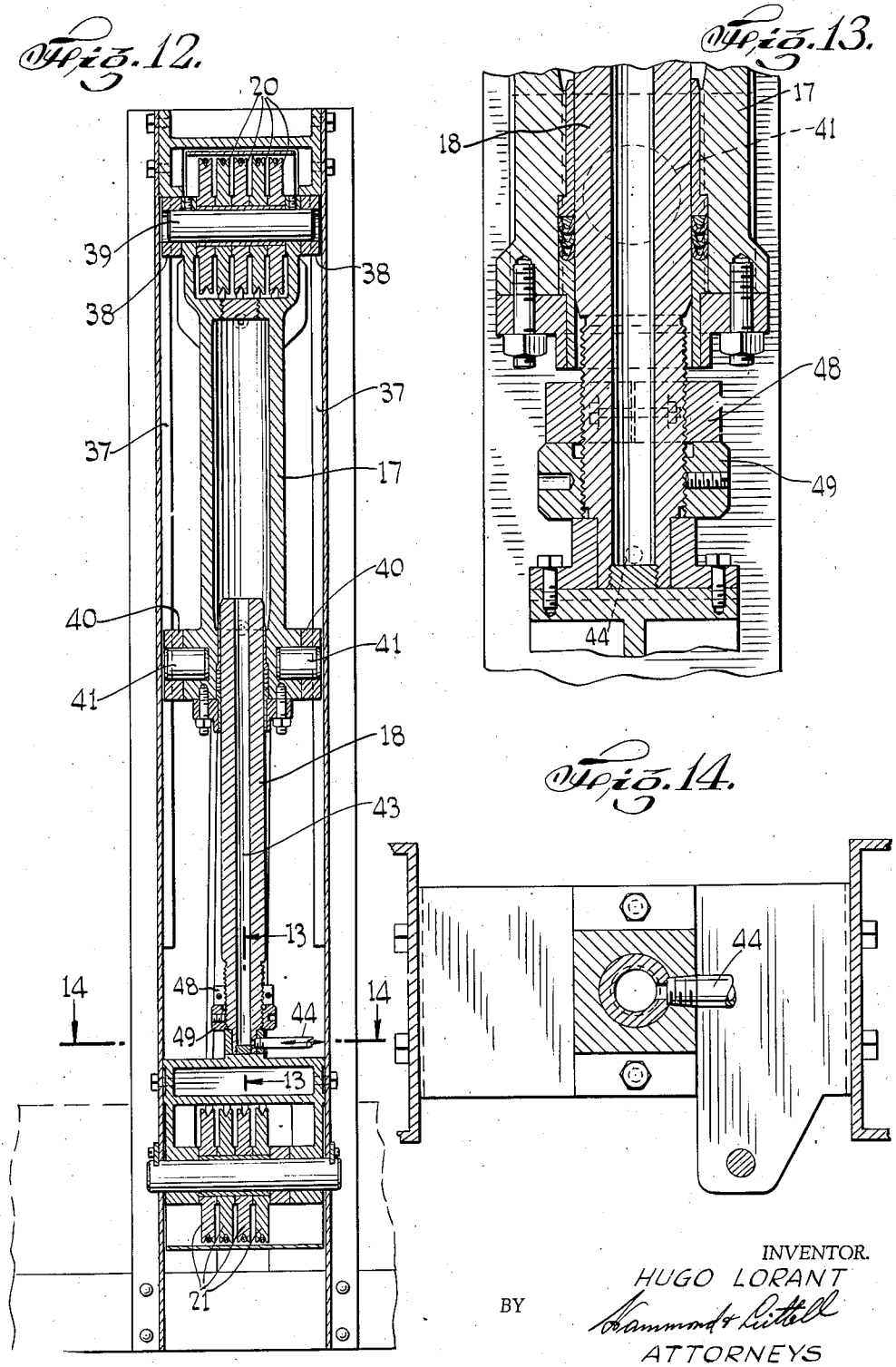

Patented July 4, 1944

2,352,960

UNITED STATES PATENT OFFICE 2,352,960

BAR CONVEYER DEVICE FOR EXTRUSION PRESSES

Hugo Lorant, New York, N. Y., assignor to The Loewy Engineering Company Limited, London, England, a corporation of Great Britain Application March 21, 1942, Serial No. 435,740

10 Claims. (Cl. 207—2)

This invention relates to extrusion presses of the type used for producing metal bars, rods, tubes, and the like, and more particularly to devices for receiving and handling the extruded metal bars, etc., immediately after forming to protect them against accidental bending and other damage and also to protect workmen from injury by the bar during the process of forming.

The extrusion press of the type to which the invention relates usually operates vertically and the extruded bar or tube, as it is formed, passes vertically downward into a pit beneath the press.

The invention has for an object to provide an improved receptacle and guide which, during the extrusion operation, receives and guides the bar to prevent bending thereof.

Another object of the invention is to provide means for conveying the bar with a minimum of manual handling to position for the next operation or at least for delivery from the extrusion press.

The receptacle serves several purposes. It guides the bar in a straight line to prevent the bar from bending seriously to the detriment of the bar, and it prevents the bar from whipping around in the pit and possibly injuring workmen. It forms part of a conveyer mechanism for transferring the bar to delivery position.

In its preferred embodiment, I provide a substantially closed straight guide which, during the extruding operation, is supported axially beneath the extrusion press to receive and confine the extruded bar, rod, tube, or the like, and which, after the extrusion operation, is moved from vertical position beneath the press to horizontal position convenient for delivery of the finished bar or the next operation on the bar. The bar is thus conveyed while it is supported and enclosed within the receptacle or guide. The accidental bending of the bar in handling is thus eliminated.

The nature and objects of the invention will be better understood from a description of a selected embodiment thereof for the purposes of which description reference should be had to the accompanying drawings, forming a part hereof, and in which:

Figure 2 is a view in side elevation, partly broken away and with certain parts shown in section, of the rod receptacle and the guiding and operating mechanism therefor;

Figure 3 is a plan view of the receptacle and operating mechanism shown in Figure 2;

Figure 4 is a sectional view taken on the line 4—4 of Figure 2;

Figure 5 is a sectional view of the carriage wheels and shaft taken on the line 5—5 of Figure 2;

Figure 6 is a view in side elevation of the conveyer receptacle and of the supporting carriage to which it is attached;

Figure 7 is a sectional view of the conveyer receptacle taken on the line 7—7 of Figure 6;

Figure 8 is a transverse sectional view of the conveyer receptacle and a table showing the door open for discharge of the bars onto the delivery table;

Figure 9 is a view in side elevation of the hydraulic mechanism for lifting the conveyer receptacle;

Figure 10 is a sectional view of the same taken on the line 10—10 of Figure 9;

Figure 11 is a horizontal sectional detail view taken on the line 11—11 of Figure 9;

Figure 12 is a vertical sectional view of the same hydraulic mechanism;

Figure 13 is a sectional detail view on an enlarged scale taken on the line 13—13 of Figure 12; and Figure 14 is a horizontal sectional detail view on a large scale taken on the line 14—14 of Figure 12.

Figure 1:
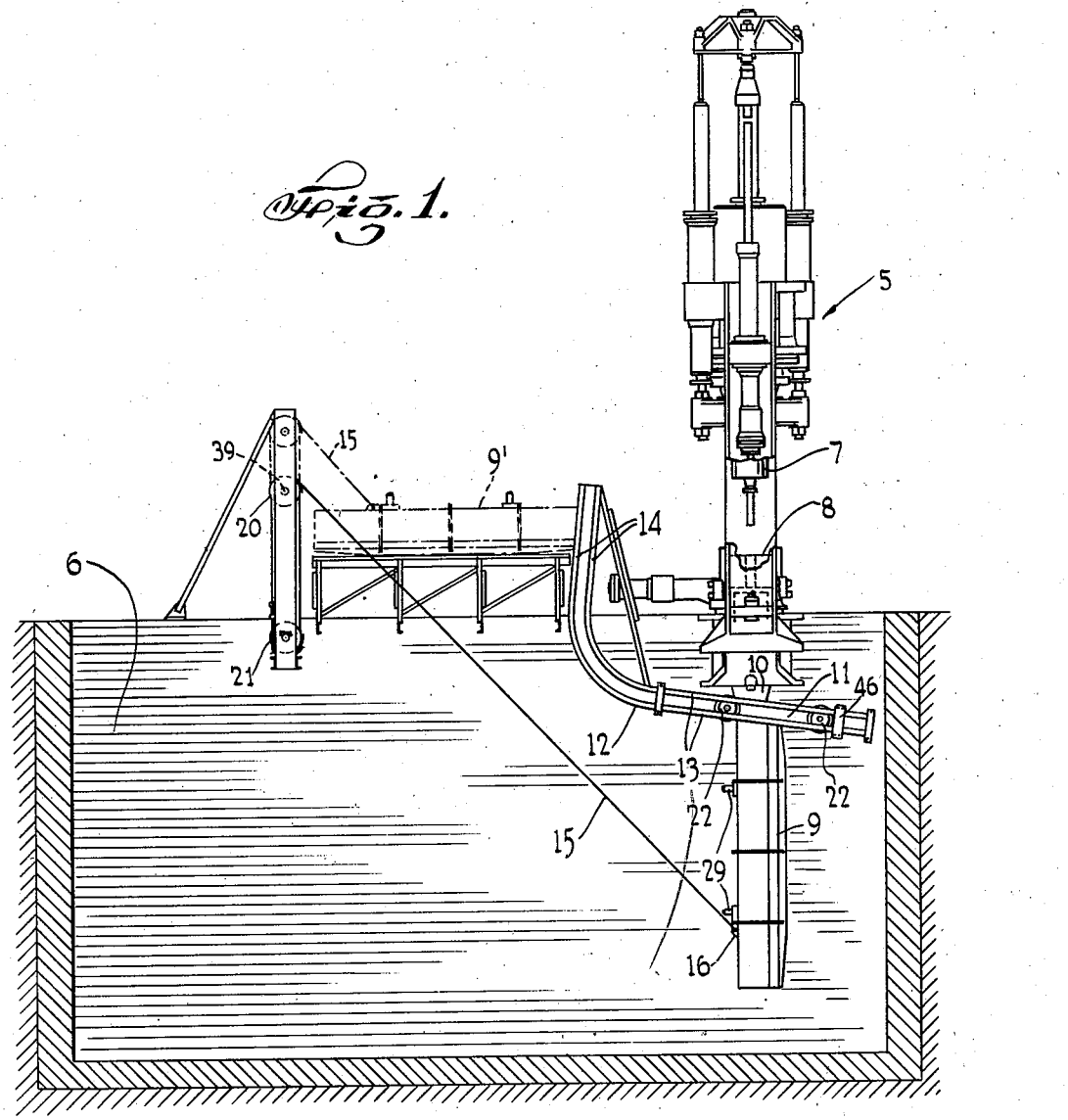
Figure 1 is a general assembly view mainly in elevation but partly in section, showing an extrusion press with a receiver for receiving the extruded bars and for conveying the same laterally and upwardly for delivery from the press.

In the apparatus shown for the purposes of illustration of the principles of the invention, an extrusion press 5 is indicated as supported over a pit 6 and arranged to extrude metal bars, rods, tubes, or the like, axially downward into the pit.

The bars are extruded from the high pressure cylinder 7, through the die 8, into the conveyer receptacle 9. A funnel member 10 is arranged between the die and the conveyer receptacle to avoid any possibility of the extruded metal bar bending and passing out laterally before it reaches the receptacle 9. The receptacle is held rigidly in the vertical position shown in full lines beneath the press while one or a number of bars are extruded into it, and then it is moved upwardly and laterally to the position shown at 9' where the bars are delivered onto a storage table or other conveyer for delivery to other parts of the plant.

The receptacle 9 is open at the top but formed to provide a complete closure on the bottom and sides serving as a guide for the extruded bars so that any tendency of the bars to bend unduly or to whip around in the pit with possible injury to workmen in the pit is effectively prevented. The receptacle is movably mounted to serve as a conveyer for transferring the bar or bars from a vertical position in the pit to a horizontal position outside the pit for the next operation thereon, or for delivery to a conveyer. In the apparatus illustrated, the next operation is performed on the same floor level as that on which the extrusion press is mounted and accordingly the receptacle is movable from vertical position beneath the press to horizontal position above the level of the floor.

As shown, the receptacle 9 is connected at one end to a carriage 11, which carriage runs on a track 12. The track comprises a lower relatively horizontal section 13 extending beneath the extrusion press in position to guide the carriage and the receptacle accurately to position axially beneath the extrusion press and an upper relatively vertical section 14 to guide the receptacle to the exact position for delivery of the formed bars. The two substantially straight sections 13 and 14 of the track 12 insure that the receptacle 9 will be in substantially vertical position below the press, and in substantially horizontal position at the point of discharge of the bars, even though the carriage is not always exactly located by the movement of the cable 15. There is at each end of the movement of the carriage and receptacle a substantially parallel movement of several inches which insures a substantially vertical position of the receptacle in the pit, and a substantially horizontal position at the point of discharge which assists in preventing bending of the rods.

In the arrangement shown, the receptacle is rigidly connected to the carriage 11 so that not only the position of the receptacle but its angle is determined by the position of the carriage on the track. As a means for moving the receptacle, there is shown a cable 15 connected to the receptacle toward its lower end, as indicated at 16, and this cable is operated by a suitable mechanism to draw the receptacle from the lowermost position, where it receives the extruded bars, to its uppermost horizontal position for delivery of the bars. The cable is shown as actuated by a fluid pressure cylinder 17 and plunger 18. The cable extends several times around the pulleys 20 at the closed upper end of the cylinder 17 and around the pulleys 21 below the piston. Admission of the fluid pressure to the cylinder thus moves the pulleys 20 upwardly and actuates the cable to move the receptacle 9 and carriage 11 along the tracks 12 to remove the receptacle 9 from the position in the pit as shown in Figure 1 to horizontal position as shown in Figure 2.

The construction of the receptacle 9 and carriage 11 is best shown in Figures 4 to 8. The receptacle is rigidly secured to the carriage 11. The wheels 22 are secured on the axles 23 and 24 of the carriage which run on the track 12. In order to provide a complete closure to prevent the bars from moving laterally from within the receptacle during extrusion, or during movement of the receptacle, a hinged cover 25 extends the full length of the receptacle 9. The cover is hinged at 25 to the body of the receptacle and is arranged to be held yieldably in either the open or closed position by means of the eccentric spring device shown in Figures 4, 6 and 8. Each of the two door supporting hinge members 27 is extended beyond the pivot 26 and a rod 28 is pivotally connected to the extension and slides through an oscillatable collar 29, pivoted in the bracket 30. A compression spring 31 presses against the pivoted collar 32 to hold the door in either the extreme open or the extreme closed position. Handles 33 on the door facilitate opening and closing the same.

The track 12 is so constructed and arranged that the receptacle is horizontal as it reaches its uppermost position and the then lower wall of the receptacle is sufficiently inclined so that as the door 25 is opened, the bars will either slide out or can be easily drawn out laterally. A table 35 is suitably positioned to receive the bars.

The track 12 comprises two pairs of spaced angle bar guides at either side of the carriage for the wheels 22. The two guides of each pair are spaced slightly more than the diameter of the wheels to provide the necessary clearance while still insuring proper guidance for the wheels.

The fluid pressure arrangement for actuating the cable 15, to raise the receptacle, is best shown in Figures 9 to 14, although it will be apparent that a windlass or any other means may be used to actuate the cable. As shown, the cylinder 17 is mounted to move vertically in the ways 37. To facilitate free movement, rollers 38 are mounted on the ends of the journal pin 39, which carries the sheaves 20 in the upper end of the cylinder structure, and rollers 40 are mounted on stud pins 41 suitably secured in the cylinder structure at its lower end. The plunger or piston 18, which works in the cylinder 17, is rigidly secured at its lower end to the supporting framework. The plunger 18 is provided with a bore 43 which in turn is connected with the fluid pressure supply pipe 44, connected with a suitable source of fluid pressure. In order that a relatively short movement of the cylinder may give a relatively long movement for the cable 15, there are five sheaves 20 at the top of the cylinder and four sheaves 21 below the lower end of the plunger. The cable end is held by a bolt 45, adjustably secured in the fixed structure of the frame from whence the cable passes several times around the respective sheaves and to the receptacle where it is attached at 16.

It is sometimes desirable to move the receptacle 9 to one side of its usual position beneath the extrusion press so that it is out of the way and the bar or tube extruded will not pass into the conveyer. For this reason, a suitable stop member is provided to limit the movement of the receptacle. As shown, the stop 46, Figure 2, is removably positioned at the lower end of the track 12. When the conveyer is to be positioned beneath the extrusion press for use, this stop is in position to limit the downward movement of the carriage 11. When the receptacle is not to be used, the stop is removed so that the carriage and the receptacle 9, secured thereto, will travel past its normal position and be out of alignment with the axis of the extrusion press.

Similarly an adjustable stop is provided for determining the length of movement of the cylinder 17. For this purpose, a split collar 48 is mounted on the lower end of the plunger 18. This removable collar 48 lies adjacent to and rests upon a collar 49, also threaded onto the plunger, as best shown in Figure 13. When the full length of stroke is desired, this collar is removed and the necessary adjustment of the bolt 45 is made.

The operation of the device for receiving and for moving the extruded rods, bars, and the like, from vertical position to horizontal position for discharge from the receptacle is obvious.

The foregoing description of a particular embodiment is illustrative merely, and is not intended as defining the limits of the invention.

It will be understood that variations in structure and arrangement may be made without departing from the scope of the invention as defined in the appended claims.

I claim:

1. In an apparatus of the character described the combination with a vertical extrusion press of a receptacle for extruded bars movable to vertical position beneath the extrusion press to receive the extruded bars and movable laterally and upwardly to a horizontal position to deliver the bars, a curved track having one portion extending substantially horizontally beneath the press and another portion extending upwardly and substantially vertically at one side of the press, a carriage movable on said track and to which one end of the receptacle is connected to be guided thereby, and means engaging the receptacle toward the other end thereof for moving said receptacle from vertical position beneath the extrusion press laterally and upwardly to horizontal position to deliver the bars.

2. In an apparatus of the character described the combination with a vertical extrusion press of a receptacle for extruded bars movable to vertical position beneath the extrusion press to receive the extruded bars and movable laterally and upwardly to a horizontal position to deliver the bars, a curved track having one straight portion extending substantially horizontally beneath the press and another straight portion extending upwardly and substantially vertically at one side of the press, a carriage movable on said track and to which one end of the receptacle is connected to be guided thereby for parallel motion beneath the press and for parallel motion at the delivery position and with a swinging movement between and means for moving the carriage and the receptacle along said track.

3. In an apparatus of the character described the combination with a vertical extrusion press of a receptacle for extruded bars movable to vertical position beneath the extrusion press to receive an extruded bar from said press and movable laterally and upwardly to horizontal position to convey said bar to position for delivery, a guide-way extending substantially horizontally beneath said press and laterally and substantially vertically, a carriage mounted on said guide-way to which the receptacle is rigidly connected to be guided in lateral and upward movement, a cable connected to said receptacle at a point spaced from the carriage and operable to convey the receptacle laterally and upwardly while guided by said carriage and guide-way, and means to actuate said cable.

4. In an apparatus of the character described the combination with a vertical extrusion press of a receptacle and conveyer for extruded bars movable to vertical position beneath the extrusion press to receive an extruded bar from said press and movable laterally and upwardly to horizontal position to convey said bar to position for delivery, a guide-way extending substantially horizontally beneath said press and laterally and substantially vertically, a carriage mounted on said guide-way to which the receptacle is rigidly connected to be guided in lateral and upward movement, a cable connected to said receptacle at a point spaced from the carriage and operable to convey the receptacle laterally and upwardly while guided by said carriage and guide-way and an air pressure cylinder connected to actuate said cable.

5. In an apparatus of the character described the combination with a vertical extrusion press of a receptacle and conveyer for extruded bars movable to vertical position beneath the extrusion press to receive an extruded bar from said press and movable laterally and upwardly to horizontal position to convey said bar to position for delivery, a guide-way extending substantially horizontally beneath said press and laterally and substantially vertically, a carriage mounted on said guide-way to which the receptacle is rigidly connected to be guided in lateral and upward movement, said guide-way having a straight portion beneath the press and means for moving the receptacle with the bars therein laterally and upwardly to horizontal delivery position.

6. In an apparatus of the character described the combination with a vertical extrusion press of a receptacle and conveyer for extruded bars movable to vertical position beneath the extrusion press to receive an extruded bar from said press and movable laterally and upwardly to horizontal position to convey said bar to position for delivery, a guide-way extending substantially horizontally beneath said press and laterally and substantially vertically, a carriage mounted on said guide-way to which the receptacle is rigidly connected to be guided in lateral and upward movement, said guide-way having a straight portion beneath the press, means for positioning the receptacle beneath the press to receive extruded bars and means for moving the receptacle with the bars therein laterally and upwardly to horizontal delivery position, a hinged door on the side of said receptacle to permit removal of the bars when the receptacle is in horizontal position and spring means to hold said door either in closed or open position.

7. In an apparatus of the character described, the combination with a vertical extrusion press of a receptacle and conveyer for extruded bars movable to vertical position beneath the extrusion press to receive the extruded bars, and movable laterally and upwardly to a horizontal position to deliver the bars, a curved track having one straight portion extending substantially horizontally beneath the press and another straight portion extending upwardly and substantially vertically at one side of the press, a carriage movable on said track and to which one end of the receptacle and conveyer is connected to be guided thereby, a cable connected to the receptacle at a point toward the free end of the receptacle and a hydraulic device comprising a cylinder and piston and a pair of groups of sheaves connected respectively to the cylinder and piston and around which the cable passes.

8. In an apparatus of the character described, the combination with a vertical extrusion press of a receptacle and conveyer for extruded bars movable to vertical position beneath the extrusion press to receive the extruded bars, and movable laterally and upwardly to a horizontal position to deliver the bars, a curved track having one straight portion extending substantially horizontally beneath the press and another straight portion extending upwardly and substantially vertically at one side of the press, a carriage having two axles and four wheels movable on said track and to which one end of the receptacle and conveyer is rigidly connected to be guided thereby, a cable connected to the receptacle at a point toward the free end of the receptacle, and means to actuate said cable.

9. In an apparatus of the character described, the combination with a vertical extrusion press of a receptacle and conveyer for extruded bars movable to vertical position beneath the extrusion press to receive an extruded bar from said press and movable laterally and upwardly to horizontal position to convey said bar to position for delivery, a guide-way extending substantially horizontally beneath said press and laterally and substantially vertically, a carriage mounted on said guide-way, to which the receptacle is rigidly connected and by which it is completely supported, and means for moving said carriage and receptacle from vertical to horizontal position, said means being releasable to permit said carriage to move by gravity from horizontal to vertical position.

10. In an apparatus of the character described, the combination with a vertical extrusion press of a receptacle and conveyer for extruded bars movable to vertical position beneath the extrusion press to receive an extruded bar from said press, and movable laterally and upwardly to convey said bar to position for delivery, a guideway extending substantially horizontally beneath said press and a carriage mounted on said guide-way, to which the receptacle is rigidly connected.

HUGO LORANT.